H. M. HOBART.
ELECTRICITY TRANSFORMING AND CONVERTING APPARATUS.
APPLICATION FILED SEPT. 21, 1916.
1,337,071.
Patented Apr. 13, 1920.
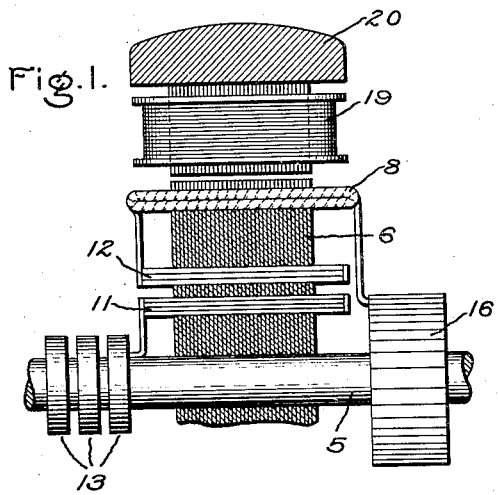
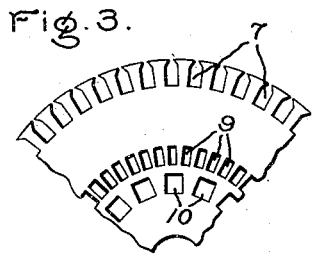
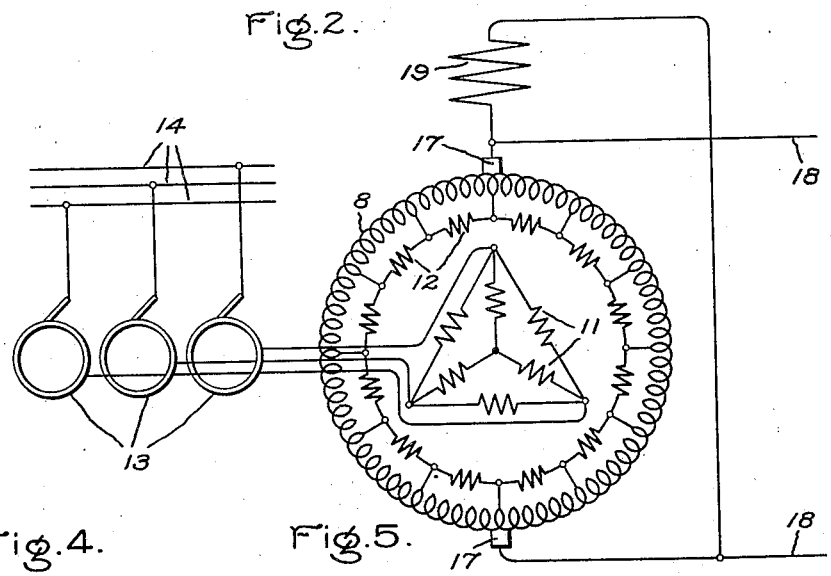
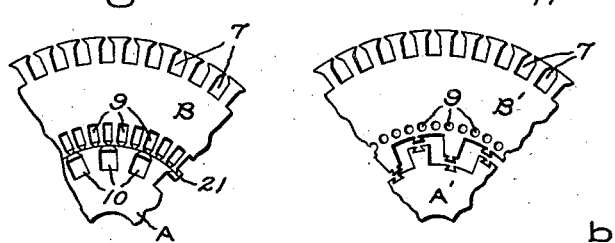
Inventor:
Henry M. Hobart,
by Albert G. Davis
His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRICITY TRANSFORMING AND CONVERTING APPARATUS.

1,337,071.   Specification of Letters Patent.   Patented Apr. 13, 1920.

Application filed September 21, 1916. Serial No. 121,504.

*To all whom it may concern:*

Be it known that I, HENRY M. HOBART, a citizen of the United States, residing at Schenectady, in the county of Schenectady, State of New York, have invented certain new and useful Improvements in Electricity Transforming and Converting Apparatus, of which the following is a specification.

My invention relates to electricity transforming and converting apparatus, that is to say, to apparatus for performing the double function of transforming alternating current electricity from one voltage to another and of converting electric energy of one form into energy of another form. More specifically, my invention relates to electrical apparatus for receiving high pressure polyphase alternating current electricity from a supply system and delivering relatively low pressure direct current electricity to a distribution system. My present invention more particularly relates to electricity transforming and converting apparatus of the type described in the copending application for Letters Patent of the United States, filed on September 6, 1916, on behalf of Charles W. Stone and myself, Serial No. 118,635.

The object of the present invention is to provide an improved electricity transforming and converting apparatus, and more particularly to provide such an improved apparatus of the type described in the aforementioned application.

The electricity transforming and converting apparatus described in the aforementioned application consists broadly of a step-down transformer carried on the shaft of a synchronous converter. The primary winding of the transformer is connected to suitable collector rings and thence to the high tension supply system, while the secondary winding of the transformer is connected to appropriate points of the armature winding of the converter. Such an arrangement enables the use in practical forms of apparatus of a large number of phases in the secondary winding of the transformer, and consequently a large number of taps per pole of the armature winding of the converter. In the forms of apparatus particularly illustrated and described in the aforementioned application, the primary and secondary windings of the step-down transformer are assembled in suitable slots or winding windows of an independent magnetic core mounted on the shaft of the converter. Thus, the converter shaft carries two magnetic cores, one of which carries the armature winding of the converter, while the other carries the transformer windings. I have discovered that the transformer and armature windings may be carried on a single magnetic core, thereby effecting a saving in the magnetic material required for the complete apparatus as well as making the apparatus more compact.

In carrying out my present invention, suitable laminations are assembled on the spider of the synchronous converter to form a single magnetic core. These laminations are provided at their surface with suitable slots for the armature winding of the converter, and with other slots arranged on circles of smaller diameter for the transformer windings. These slots are so positioned that the working transformer flux does not deleteriously affect the working flux to which the armature winding is normally subjected, and vice versa, although since certain portions of the laminations provide a magnetic path common to both systems, such portions will carry the resultant flux which will sometimes be less and sometimes greater than the component fluxes.

The novel features of the invention which I believe to be patentable are definitely indicated in the appended claims. The construction and mode of operation of an apparatus embodying the invention will be understood from the following description taken in conjunction with the accompanying drawings, in which;

Figure 1 is an elevation, partly in section, of the upper half of an electricity transforming and converting apparatus embodying my present invention; Fig. 2 is a diagram of the electrical connections of the apparatus of Fig. 1; Fig. 3 is a detail view of a lamination of the magnetic core of the apparatus, and Figs. 4 and 5 illustrate modified forms of laminations for the magnetic core.

The improved apparatus of my present invention comprises a shaft 5 rotatably mounted in suitable bearings, not shown in the drawings. A laminated magnetic core 6 is mounted in any suitable manner on the shaft 5. The core 6 is built up of laminations having an arrangement of uniformly distributed slots such as is represented in Fig. 3 of the drawings. There are three series of these slots arranged on circles of different diameters. The outer series of slots 7 is near the periphery of the laminations, and is adapted to carry the armature winding 8 of a synchronous converter. The inner series of slots 9 and 10 are some distance removed from the slots 7, but are themselves close together. The innermost series of slots 10 are larger than the slots 9, and are designed to accommodate the primary winding 11 of a step-down transformer. The middle series of slots 9 carry the secondary winding 12 of the transformer.

The primary winding 11 of the step-down transformer is connected to collector rings 13 mounted on the shaft 5 and suitably insulated and designed for the high tension of the supply system. In Fig. 2, I have diagrammatically represented the collector rings 13 electrically connected to a three-phase supply system 14. The primary winding 11 may to advantage consist of a plurality of coils connected to produce a greater number of phases than the supply system. Thus, in the case of a three-phase supply system the primary winding 11 is preferably made up of six phase-windings, three of which are star-connected and the other three of which are delta or mesh connected, and these two three-phase transformer windings are then connected in parallel to the collector rings 13, as represented in Fig. 2. These are two separate secondary coils or windings for each phase-winding of the primary winding, and these twelve secondary coils may be mesh-connected, as represented in Fig. 2. The secondary winding of the step-down transformer is, accordingly, arranged as a twelve-phase winding. The secondary winding 12 is connected to the armature winding 8 and with the arrangement represented in Fig. 2, there are twelve taps per pair of poles of the synchronous converter. In the diagram of Fig. 2, I have represented a two-pole converter, but it will of course be understood that this illustration is purely for explanatory purposes, and the converter may have as many poles as desirable.

The armature winding 8 of the converter is connected in the usual manner to the segments of a commutator 16. Brushes 17 bear on the commutator 16, and are electrically connected to a direct current distribution system 18. The field coils 19 of the converter are arranged on the stator frame 20 in any suitable manner. The coils 19 are energized from the system 18 and constitute the field magnet system of the converter. While I have not illustrated interpoles in the apparatus shown in the accompanying drawings, it will of course be understood by those skilled in the art that interpoles may be employed where necessary or desired.

The armature winding 8 may be made up of form-wound coils in the usual manner. The primary and secondary windings of the step-down transformer may also be composed of form-wound coils. However, I prefer to employ for the transformer windings bundles of straight conductor bars, thoroughly insulated in advance and "solid filled," the filling being so thoroughly applied that there are absolutely no air spaces of the minutest description in the course of the length of the slot from end to end, after the windings have been fitted in the slots. The solid-filled bundles of conductors are insulated from one another by a layer of micarta, or by bakelized tubes, and are pushed through the slots in the magnetic core, and the end connections between turns are made after these straight bundles have been fitted in place. Even when there are quite a number of conductors per slot the end connections may be so skilfully made, that the joints in the end connections are really inconspicuous. As a matter of fact, in the transformer arrangement of my present invention, however, there need be but very few conductors per slot, and there are consequently but few end connections to make.

The small amount of magnetic material between the primary and secondary slots constitutes a magnetic leakage path between the primary and secondary windings. This leakage is of particular advantage in a transformer for use with a synchronous converter, since it gives a suitable reactance to the transformer to enable the commutator voltage to be responsive to field adjustments.

The operation of the apparatus will, it is believed, be clearly understood by those skilled in the art from the foregoing description. As previously mentioned, the magnetic circuit for the transformer flux is practically independent of the magnetic circuit for the working flux of the converter. The working fluxes of the transformer and converter thus do not deleteriously interfere with or affect one another, and the transformer and converter function in effect as if they had separate and independent magnetic cores. By my improved arrangement, however, a considerable economy is effected in the required amount of magnetic material for the complete apparatus. This saving in the amount of magnetic material is accompanied by a decreased weight of the movable element of the apparatus. Furthermore, by assembling the transformer windings in suitable slots in the magnetic core of the synchronous converter, a much more compact structure is obtained than where two independent cores are mounted side by side on the shaft.

While I have heretofore stated that the magnetic core 6 is preferably made up of a single set of laminations, it will of course be understood that each layer of laminations may consist of several separate punchings, and this may be desirable where form-wound coils are used for the transformer windings, in order to facilitate the assembling of these coils. Thus, in Figs. 4 and 5 of the drawings, I have indicated two modified forms of laminations. In Fig. 4, each laminated layer consists of two punchings A and B. The line of division between these two punchings is the open ends of the two series of slots 9 and 10. Thus, the laminations A are first assembled on the spider of the converter and the primary coils are assembled in the slots 10. These slots may then be closed by suitable wedges, as diagrammatically indicated by reference numeral 21 in Fig. 4. The laminations B are then slipped over the solid core formed by the laminations A, and the secondary conductors are next assembled in the slots 9. In Fig. 5, each laminated layer consists of two punchings A' and B'. The inner set of punchings A' are first assembled on the rotor spider to form a solid core. The primary coils are then set in place, and the punchings B' are assembled one at a time. The registering dove-tailed projections of the two punchings A' and B' are fitted together, thereby establishing the primary slots. In Fig. 5, the two punchings A' and B' are not shown fitted together, so that the construction may be clearly understood. The conductors of the secondary winding are thrust through the holes 9 provided therefor in the punchings B.

For the purposes of explanation, I have shown the step-down transformer as consisting of delta-connected and star-connected three-phase primary windings connected in parallel to the collector rings, and a twelve phase mesh-connected secondary winding. Numerous other satisfactory arrangements of the transformer windings are disclosed in the aforementioned patent application, and may be employed in the apparatus of my present invention. One of the particular advantages of a rotating secondary winding in connection with a synchronous converter is the facility with which a relatively large number of secondary phases and hence a correspondingly large number of taps per pair of poles of the converter may be obtained. Accordingly, the secondary winding 12 of the improved apparatus of my present invention may consist of more than twelve phases, and I do not, therefore, wish to be limited to the particular arrangement of transformer windings herein described for explanatory purposes.

I have explained my invention by illustrating and describing a certain specific embodiment thereof, but it will be readily understood by those skilled in the art that the invention may be embodied in many other forms than that shown and described. I accordingly, do not wish to be restricted to the particular form of construction disclosed herein by way of example nor in the choice of recognized equivalents nor in the embodiment of means to an end except as set forth in my claims hereunto appended.

What I claim as new and desire to secure by Letters Patent of the United States, is:—

1. An electricity transforming and converting apparatus comprising a synchronous converter having a stationary magnetic field system and a rotatable magnetic core, said magnetic core having distributed slots near its surface and other distributed slots arranged on circles of smaller diameter than the diameter of said core, a commutated armature winding arranged in said first mentioned slots, a polyphase transformer having primary and secondary windings arranged in said second mentioned slots, collector rings electrically connected to the primary winding of said transformer, and means electrically connecting the secondary winding of said transformer to said armature winding.

2. An electricity transforming and converting apparatus comprising a synchronous converter having a stationary magnetic field system, a commutated armature winding arranged to rotate within the influence of said field system, a step-down transformer having primary and secondary windings, the secondary winding of said transformer being electrically connected to said armature winding, a single magnetic core having slots in which said armature and transformer windings are carried, said core constituting the magnetic circuit of said transformer, and collector rings electrically connected to the primary winding of said transformer.

3. An electricity transforming and converting apparatus comprising a rotatable shaft, a magnetic core mounted on said shaft, a commutated winding carried near the surface of said core, a stationary magnetic field system within whose influence said winding is arranged, a transformer having primary and secondary windings carried by said core, said core constituting the magnetic circuit of said transformer, the secondary winding of said transformer being connected to said commutated winding, and collector rings mounted on said shaft and electrically connected to the primary winding of said transformer.

4. An electricity transforming and converting apparatus comprising a step-down polyphase transformer having primary and secondary windings, a synchronous converter having a stationary magnetic field system, a rotatable shaft, and a magnetic core mounted thereon, and a commutated armature winding arranged to rotate within the influence of said field system, the secondary winding of said transformer being electrically connected to said armature winding, the primary and secondary windings of said transformer and said armature winding being each carried by said magnetic core, said core constituting the magnetic circuit of said transformer.

5. An electricity transforming and converting apparatus comprising a rotatable shaft, a magnetic core mounted on said shaft, said magnetic core having three series of slots arranged on circles of different diameters, the outer series of said slots being near the surface of said core, a commutated armature winding arranged in said outer series of slots, a stationary magnetic field system within whose influence said armature winding is arranged, a transformer having primary and secondary windings, the primary winding of said transformer being arranged in the innermost series of said slots, the secondary winding of said transformer being arranged in the middle series of said slots and electrically connected to said armature winding, and collector rings mounted on said shaft and electrically connected to the primary winding of said transformer.

6. An electricity transforming and converting apparatus comprising a synchronous converter having a stationary magnetic field system and a rotatable magnetic core, said magnetic core having slots near its surface, a commutated armature winding assembled in said slots and arranged to rotate within the influence of said field system, and a transformer having primary and secondary windings carried by said magnetic core, said core constituting the magnetic circuit of said transformer, the secondary winding of said transformer being electrically connected to said armature winding.

In witness whereof, I have hereunto set my hand this 20th day of September, 1916.

HENRY M. HOBART.